United States Patent [19]

Glenn et al.

[11] Patent Number: 4,901,361
[45] Date of Patent: Feb. 13, 1990

[54] AUTOMATED SPALL PANEL ANALYZER

[75] Inventors: Joseph G. Glenn, Fort Walton Beach, Fla.; David L. Hamil, Huntsville, Ala.

[73] Assignee: The United States of America as represented by the Secretary of the Air Force, Washington, D.C.

[21] Appl. No.: 202,759

[22] Filed: May 27, 1988

[51] Int. Cl.[4] .............................. G06K 09/48
[52] U.S. Cl. ....................... 382/18; 73/167; 377/6; 382/1
[58] Field of Search ............ 73/167; 33/1 L; 377/19; 434/17, 19; 358/19, 93; 364/517; 382/22, 26, 18, 1

[56] References Cited

U.S. PATENT DOCUMENTS

| 253,914 | 2/1882 | Dean. | |
|---|---|---|---|
| 3,447,077 | 5/1969 | Loxley et al. | 324/70 |
| 3,893,336 | 7/1975 | Tucker | 73/167 |
| 3,932,748 | 1/1976 | Schmitz | 250/303 |
| 4,292,851 | 10/1981 | Brewer | 73/762 |
| 4,334,423 | 6/1982 | Rainis et al. | 73/35 |
| 4,619,616 | 10/1986 | Clarke | 434/19 X |
| 4,638,369 | 1/1987 | Hsieh | 382/22 X |
| 4,644,583 | 2/1987 | Watanabe et al. | 382/22 |
| 4,657,511 | 4/1987 | Allard et al. | 434/20 |
| 4,671,165 | 6/1987 | Heidmann et al. | 364/423 X |

FOREIGN PATENT DOCUMENTS

| 0646781 | 12/1984 | Switzerland | 273/371 |
|---|---|---|---|
| 2086243 | 5/1982 | United Kingdom | 273/371 |

Primary Examiner—Daniel M. Yasich
Attorney, Agent, or Firm—Robert L. Nathans; Donald J. Singer

[57] ABSTRACT

Method of producing spall analysis data indicative of the number, size and locations of a substantial number of highly irregularly shaped spall holes, having widely varying sizes, formed within a spall panel by a projectile. A photograph of the panel is electronically scanned by a vidicon on a row by row basis, and the resulting pulse train is manipulated by a digital computer employing particular algorithms to produce the spall analysis data.

10 Claims, 5 Drawing Sheets

AUTOMATED SPALL PANEL ANALYZER

This invention relates to the field of spall panel analysis.

In accordance with prior methods of analyzing the spall collecting panel, individuals manually record data off of damaged spall panels by a rather crude method of counting and measuring holes by hand. This can become quite an arduous job when you have 300 to 400 holes on one spall panel to count. One can easily see how errors are made in the data accumulation process by the tedious nature of the job. It is desirable to enable the user to first take a picture of the damaged panel, and then, through the use of a light table, feed the data into a computer. The data would be processed by an analog to digital converter at which time it would be ready for manipulation by the computer. A computer program thus takes the place of manual counting and hole size and shape estimation.

In U.S. Pat. No. 3,893,336 issued to Tucker, a target panel which has been blasted with a shotgun is analyzed by scanning the panel with a vidicon, and inputting the resulting electronically generated image into a computer which scans the target, recognizes each hole and positions the hole in a two dimensional coordinate system through the use of a computer program The screen is divided into a large plurality of pixel sub-areas and wherever a sufficient number of sampling pixels representing a hit are found in a contiguous grouping, the computer interprets the resulting information as indicating the existence of a shot hole. The presence of four pixel intensity readings are sufficient to indicate the presence of a single shot hole. Since the position of these hit pixels within an x-y sampling array is established by the vidicon, the computer is able to thus establish the location of each cluster of four hit pixels and is also able to count the total number of holes within a central target area.

SUMMARY OF THE INVENTION

It is an object of the present invention to provide a more sophisticated system than that disclosed by Tucker, by the computation of the number and exact size of a large plurality of the irregularly shaped spall holes. In the Tucker system, each shotgun pellet produces a single hole of about the same size, and thus Tucker is not concerned with the recording of the exact size of a large plurality of irregularly shaped holes which vary considerably in size. It is a further object of this invention to provide a method of analysis for not only establishing the size, shape and location of each spall hole, but labeling each spall hole sequentially with a spall number for reference purposes and to establish the total number of spall holes present in any particular desired area of analysis. The method provides for accurately determining the size, shape and number of a plurality of highly irregular shaped holes within a selected target image area and includes the steps of producing a first hit data array of clusters of elemental electronic pixel hit data having a distribution within the hit array corresponding to locations of pixel sub-areas within the holes, each cluster indicating the size and location of each hole within the target image area, producing a spall number data array of clusters of electronic spall data, having a distribution within the spall number data array corresponding to pixel sub-areas within the hit array, each cluster of spall data having first values for a first hole cluster, second values for a second cluster, and nth values for an nth cluster, where n is an integer, to indicate the number and position of discrete spall holes within the target area. Thus a hit data array is sequentially generated along with a spall number data array, the pixel sub-areas of each array corresponding with one another. As the analyzer scans the electronic input image of the spall pattern, clusters of hit data pixels are produced by thresholding input intensity data. The analyzer employs a key algorithm for detecting a first particular pixel hit data byte indicative of a hit, examines a plurality of neighboring pixel hit data bytes adjacent the first particular hit data byte within the hit data array, and assigns a new spall number to the byte within the spall number data array corresponding to the first particular pixel hit data byte should none of the neighboring pixel hit data bytes indicate a hit. Conversely, the previously recorded spall number is retained, should at least one of the neighboring pixel hit bytes indicate a hit. In other words by comparing adjacent hits in the hit data array, the spall number data array is controlled in a manner so that the same spall number is repeated for each pixel in the spall number data array representing a single hole until the cluster relating to a single hole terminates. Upon the detection of a new cluster (hole) by the controlling hit data array algorithm a spall number accumulator is stepped by one so that the next higher number is now placed in the cluster of data within the spall data array, thus numbering a first hole #1, a second hole #2, and so forth.

BRIEF DESCRIPTION OF THE DRAWINGS

Other objects, features and advantages of the invention will become apparent upon study of the following description taken in conjunction with the drawings in which.

DETAILED DESCRIPTION OF THE PREFERRED EMBODIMENT

Figure 1:
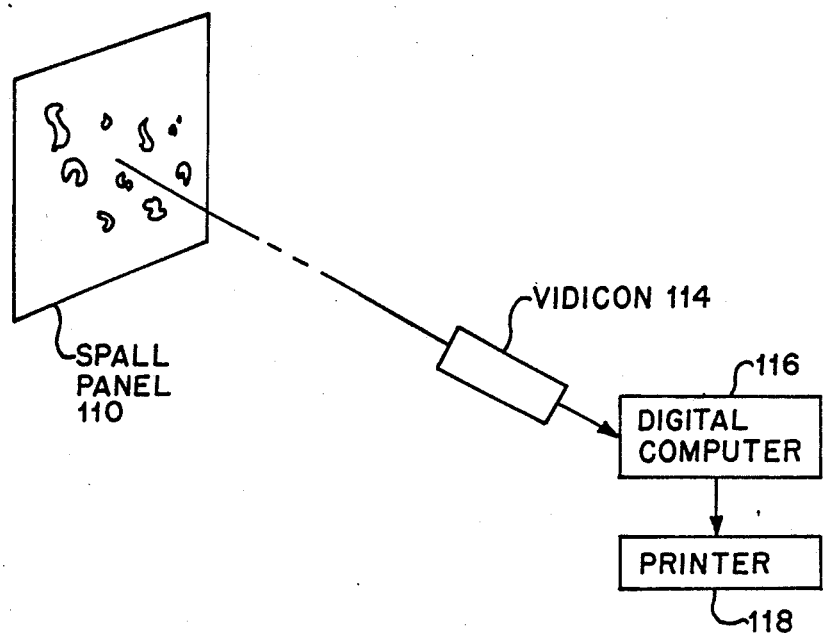
FIG. 1 schematically illustrates the scanning of the spall panel.
Figure 2:
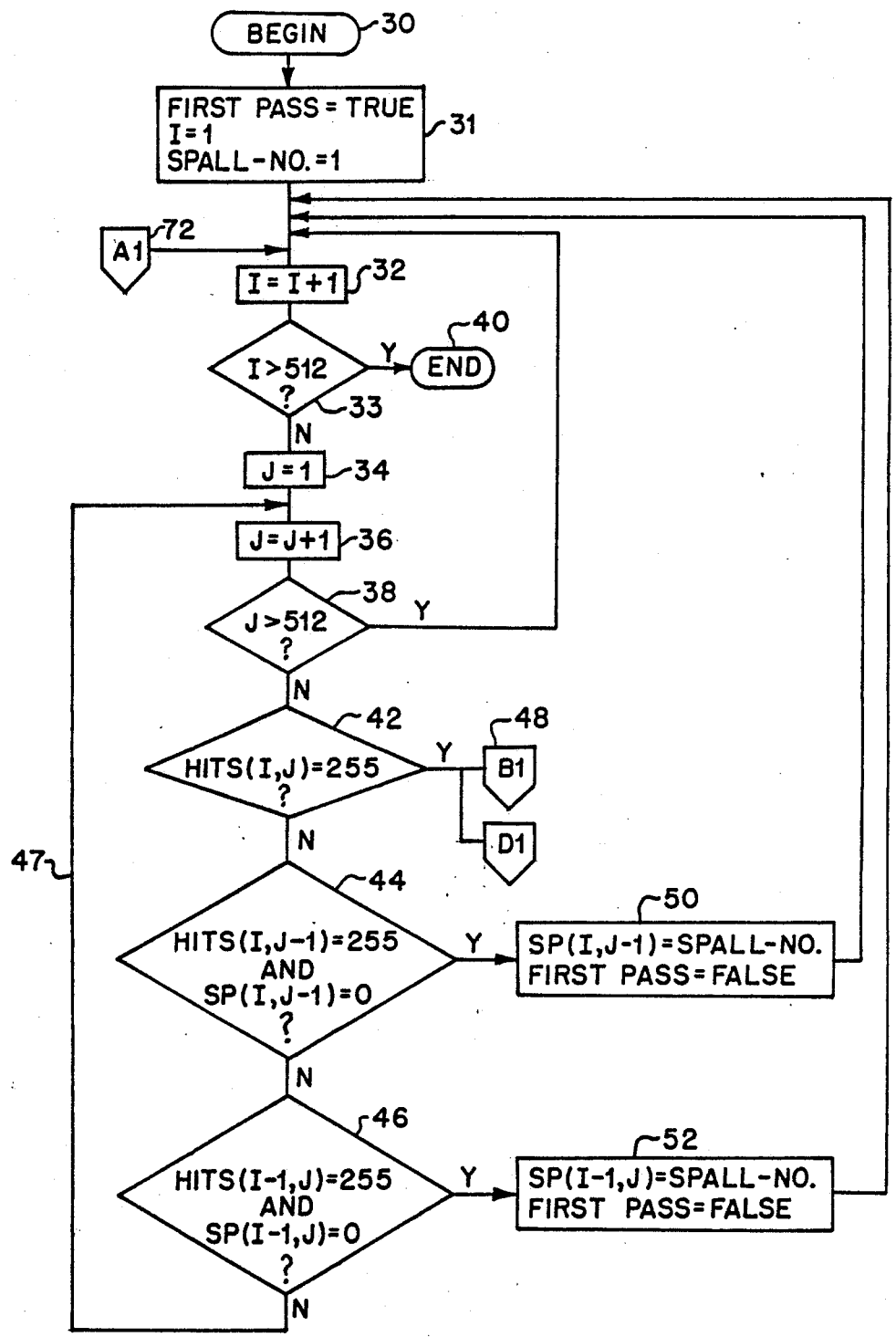
FIGS. 2–5 illustrate flow charts for executing the method of the invention.
Figure 3:
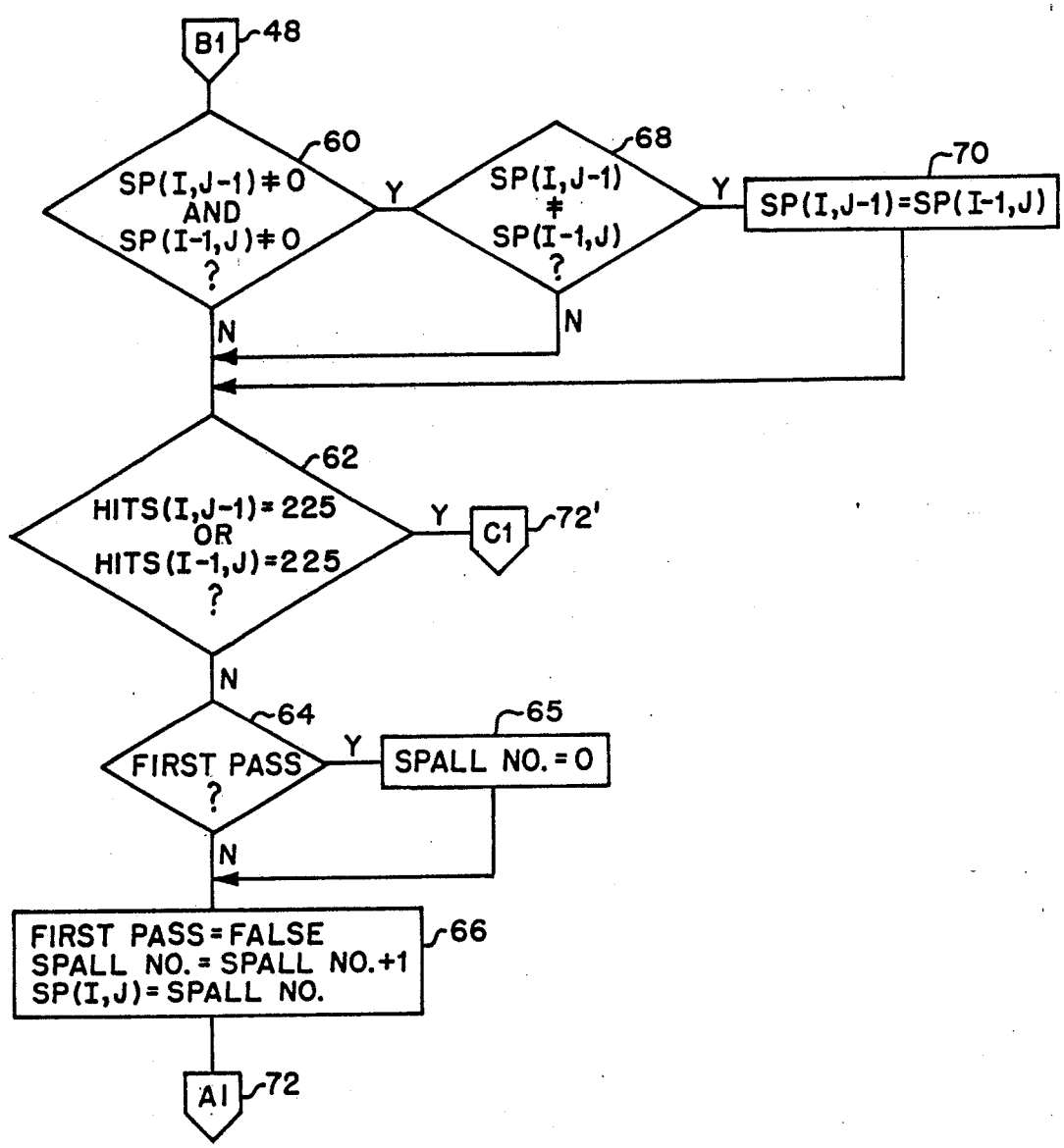
Figure 4:
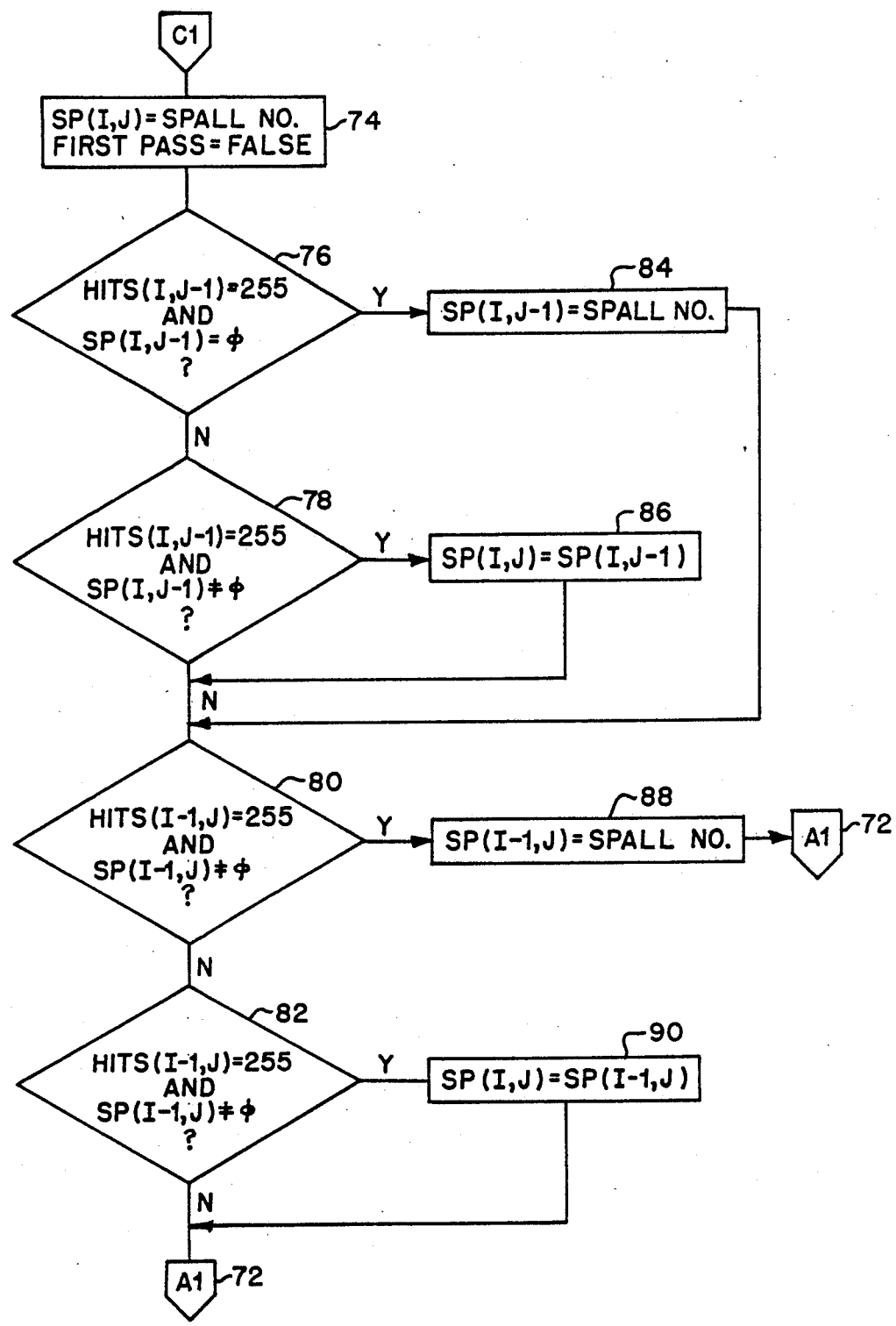

In FIG. 1, a spall panel 110 is illustrated, containing the plurality of irregularly shaped holes 112 which are produced in the test panel by the projectile. In reality, many more holes of widely varying sizes are produced in the panel. Vidicon 114 scans the image of spall panel 110 and forwards the resulting digital pulse train to digital computer 116 which executes the algorithms to be described, to print out the desired data at 118. The program executed by computer 116 of FIG. 1, is divided into sub-programs A–D in FIGS. 2, 3, 4 and 5. Thus FIG. 2 should be placed to the left and FIGS. 3, 4 and 5 should be placed alongside FIG. 2 in order to have a good overview of the entire program. An important function of subprogram A of FIG. 2 is to sequentially scan the image area by pixel hits in the pixel hit array on a row by row basis. In other words the program steps along each row through the use of a $J=J+1$ accumulator. Whenever a hit is detected during this scanning process, the information is forwarded to subprogram B which will first assign spall number one to each pixel in the first cluster in the data array representing the first hole. When subprogram A determines that the first hit cluster has ended and detects a second hit cluster, a spall number accumulator in subprogram B is stepped so that a second spall number is assigned to the data cluster in the spall number data array corresponding to the second hit (hole) cluster in the hit array. Subprogram C of FIG. 4 continues to label pixels representing a particular hole or cluster within the next corresponding cluster in accordance with the spall number assigned by subprogram B.

The term HITS (I,J) refers to the current pixel byte in the hit data array, where I represents a row between the first row I1 and the last row I512. J represents the column extending from the first column J1 to the last column J512; thus the matrix of the hit array is a matrix of data in a pixel field of 512 multiplied by 512. The term HITS (I,J−1) represent the pixel immediately to the left of the current pixel namely HITS (I,J). HITS (I−1,J) represents the pixel directly above the current hit pixel (I,J). In like manner SP(I−1, J) represents the pixel in the spall data array directly above the current pixel namely SP(I,J). Lastly SP(I,J−1) represents the pixel to the left of the current pixel in the spall data array. The array variables are initialized by setting I=2 and J=1 so that the first column second row pixel subarea will be examined by the analyzer. Thus the program begins at 30, the row is initialized with a one along with spall number one at 31, the row is stepped by one at 32, the first column is established at 34 and stepped by one at 36 to initiate the process at row 2 column 2 of the hit data array.

Diamond 42 returns a true to 48 indicative of a hit if the intensity level is set at 255 rather than zero which indicates the absence of a hit. The 255 is an arbitrary figure which is produced in response to the detection of a pixel exceeding a predetermined threshold value. Should no hit be detected 42, program execution proceeds to 44, and since there is no hit at the beginning of the process the program control is returned via 44 and 46 to the input of the J accumulator 36, and the program steps to the next column in the second row and the process is repeated at 42. The program continues to loop via 47 until a hit is detected at 42 whereby a true is forwarded by 48 to the input of subprogram B. Since the spall array contains all zeros, and since this is the first hit detected, control passes to diamond 64 which produces a zero spall number at 65 since this is the first pass, and the spall number of one is established in spall number accumulator 66 to set the stage for the labeling of the first cluster of data in the spall data array with one corresponding to the first hole being examined. The program returns via 72 to the J=J+1 accumulator to step the row 2 scan to the next column.

Let it be assumed that a number of hits are sequentially detected at 42; 62 will then return a true to the input to subprogram C at 72 since the hit immediately to the left of the current hit is a true (255). Thus 76 (FIG. 4) will cause 84 to be actuated to assign spall number one to the spall pixel to the left of the current pixel. Since this is the first row of hits to be detected, 88 and 90 will not be executed since hits (I−1,J) are never equal to 255 and program control returns via A1 to subprogram A. Upon the termination of the detection of true hits in the row being scanned, 84 will no longer be executed since hits (I,J−1) are no longer equal to 255. Now let us assume that we are scanning the next lowest row and detect true hits from the first hole. At this point, hits (I-1,J) will be true since the hits in the previous row were true, and program control passes to block 88 to assign spall #1 to the spall pixel directly above the currently scanned spall pixel, namely, SP(I−1,J), the currently scanned spall pixel being SP(I,J). Thus, spall #1 is assigned to the previous row of hit pixels. Since SP(I−1,J) is now unequal to zero, and the hit pixel indicates a hole, diamond 82 causes the spall number just assigned as stated above to be assigned to the current spall pixel scanned, namely SP(I,J) at 90.

Now let it be assumed that after considerable looping of the I and J scanning array via 47 and 40, that a first hit pixel is detected by 42 of the second hole, control again passes via 48 to subprogram B and since a hole has not been detected for some time, control drops through diamond 60, 62, and 64, and causes block 66 to be executed to thereby increment the spall number accumulator 66 so that the stage is set for the labeling for the next cluster of data in the spall data array. The process is repeated as explained above, so that a hit to the left of the current hit detected at 62 will again cause program control to proceed via 72' to subprogram C. The entire process executed by subprogram C will proceed as before to cause the clusters of data in the spall number data array to be labeled with spall #2 rather than spall #1 as previously described. If the spall pixel to the left of the current spall pixel is unequal to zero and the spall pixel above the current pixel is unequal to zero, 60 invokes diamond 68 which causes the two adjacent pixels to be set equal to each other at 70 in the event that they are not equal, and blocks 50 and 52 assign the current spall number to the adjacent pixels in the spall data array.

It should now be appreciated that for each cluster of hits in the hit array there should be a corresponding data cluster in the spall data array sequentially labeled with ascending numbers representing the labeling of the holes. The scanning process terminates when the last row exceeds 512 as indicated by the output of diamond 33, to end a frame scan at 40.

Figure 5:
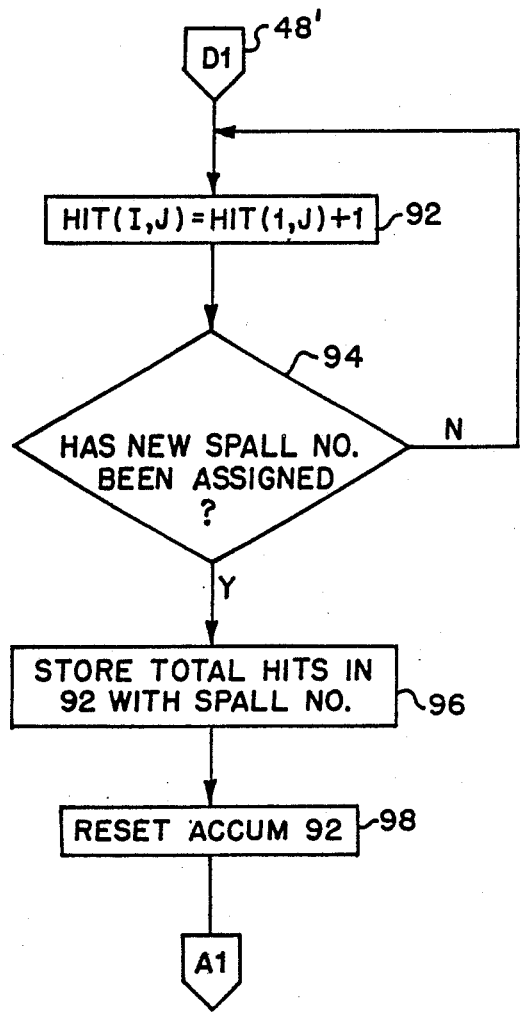

Subprogram D of FIG. 5 may be called to count the number of hit pixels within each hole thereby to indicate the size of the hole. Each output from diamond 42 indicating a hit pixel causes block 92 to step the hit accumulator by one. Should a new spall number just be assigned by subprogram B (block 66), 94 passes control to 96 which reads out the old accumulated pixel hit count (block 92) and stores it along with the appropriate spall number. The hit accumulator 92 is now reset (block 98) to initiate the new count of the current hole being analyzed.

It should be obvious to the skilled worker that numerous variations may be made within the scope of the invention, which deviate from the precise steps set forth above, and thus the invention is to be limited only by the scope of the following claims.

What is claimed is:

1. A method of accurately determining the size, shape and number of a plurality of highly irregular shaped spall holes within a target image area, including the steps of:
   (a) producing a hit data array of clusters of elemental electronic pixel hit data having a distribution within the hit array corresponding to locations of pixel sub-areas within the holes, each cluster indicating the size and location of each hole within the target image area;
   (b) assigning spall hit numbers sequentially and automatically to each spall hole and each said cluster; and
   (c) producing a spall number data array of clusters of electronic spall data, having a distribution within the spall number data array corresponding to pixel sub-areas within the hit array, each cluster of spall data having first values for a first hole cluster, second values for a second hole cluster, and nth values for an nth hole cluster, where n is an integer, to indicate the number and position of discrete spall holes within the target area.

2. The method of claim 1 wherein step (b) further includes the steps of detecting a first particular pixel hit data byte indicative of a hit, examining a plurality of neighboring pixel hit data bytes adjacent the first particular hit data byte within the hit data array, and assigning a new spall number to the byte within the spall number data array corresponding to said first particular pixel hit data byte should none of the neighboring pixel hit data bytes indicate a hit and conversely, retaining a previously recorded spall number recorded during the performance of step (b) should at least one of the neighboring pixel hit bytes indicate a hit.

3. The method of claim 1 including accumulating a hit pixel count within an accumulator, indicative of the number of hit pixels scanned within each particular hole to indicate hole size.

4. The method of claim 3 wherein said hit pixel count is reset to zero upon the production of a newly assigned spall number.

5. The method of claim 3 wherein step (a) is performed by scanning said image area on a row by row basis.

6. The method of claim 5 wherein said hit pixel count is reset to zero upon the production of a newly assigned spall number.

7. The method of claim 2 including accumulating a hit pixel count within an accumulator, indicative of the number of hit pixels scanned within each particular hole to indicate hole size.

8. The method of claim 4 wherein said hit pixel count is reset to zero upon the production of a newly assigned spall number.

9. The method of claim 4 wherein step (a) is performed by scanning said image area on a row by row basis.

10. The method of claim 6 wherein said hit pixel count is reset to zero upon the production of a newly assigned spall number.

* * * * *